(12) United States Patent
Buahin et al.

(10) Patent No.: US 12,037,262 B2
(45) Date of Patent: Jul. 16, 2024

(54) SYSTEMS AND METHODS RELATING TO EFFECTIVE MANAGEMENT OF FLUID INFRASTRUCTURE

(71) Applicant: Xylem Vue Inc., Rye Brook, NY (US)

(72) Inventors: Caleb Buahin, Mishawaka, IN (US); Mehmet Ercan, South Bend, IN (US); William Knight, Long Beach, IN (US); Timothy Ruggaber, South Bend, IN (US); Bryant McDonnell, Boulder, CO (US)

(73) Assignee: Xylem Vue Inc., New York, NY (US)

( * ) Notice: Subject to any disclaimer, the term of this patent is extended or adjusted under 35 U.S.C. 154(b) by 774 days.

(21) Appl. No.: 17/161,674

(22) Filed: Jan. 29, 2021

(65) Prior Publication Data

US 2021/0230016 A1    Jul. 29, 2021

Related U.S. Application Data

(60) Provisional application No. 62/967,051, filed on Jan. 29, 2020.

(51) Int. Cl.
| | |
|---|---|
| *C02F 1/00* | (2023.01) |
| *G06N 3/045* | (2023.01) |
| *G06N 3/08* | (2023.01) |

(52) U.S. Cl.
CPC ............. *C02F 1/006* (2013.01); *G06N 3/045* (2023.01); *G06N 3/08* (2013.01)

(58) Field of Classification Search
CPC ... C02F 1/006; C02F 2209/001; G06N 3/045; G06N 3/08; G06N 3/04; E02B 13/02;
(Continued)

(56) References Cited

U.S. PATENT DOCUMENTS

| | | | | |
|---|---|---|---|---|
| 4,180,083 A | * | 12/1979 | Miyaoka | H02J 15/003 |
| | | | | 137/101.25 |
| 4,422,942 A | | 12/1983 | Allington | |

(Continued)

FOREIGN PATENT DOCUMENTS

| | | | | | |
|---|---|---|---|---|---|
| CA | 3006333 C | * | 4/2020 | ............. | E02B 3/00 |
| CN | 109197539 A | * | 1/2019 | ............. | A01G 25/16 |

(Continued)

OTHER PUBLICATIONS

Kiran S. Shingote, Priti Shahane, Microcontroller Based Flow Control System for Canal Gates in Irrigation Canal Automation, 2016, 5 pages (Year: 2016).*

(Continued)

*Primary Examiner* — Yongjia Pan
(74) *Attorney, Agent, or Firm* — Stanek Lemon Crouse & Meeks, PA

(57) ABSTRACT

Fluid stream management systems and methods are described. An exemplar fluid stream management system includes a neural network connected to a cascading treatment processor. The neural network calculates an initial distant flow condition attribute value for a distant fluid treatment facility. The cascading treatment processor using hydrological information and the initial distant flow condition attribute value computes a predicted modified contribution value for the distant fluid treatment facility. The cascading treatment processor instructs multiple fluid flow controllers, each of which controls the operation of a flow-directing device such that a sum of the predicted modified total load value and a real time total load value of the distant fluid treatment facility is minimized. The real time total load value of the distant fluid treatment facility is based upon real time measurements obtained from one or more of the distant fluid treatment facility sensors.

16 Claims, 8 Drawing Sheets

(58) Field of Classification Search
CPC ..... E02B 3/00; E02B 5/06; E02B 7/20; E02B 8/045; G05D 7/00; G05D 7/067; G05D 7/0635; G05D 7/0641; G05D 7/0647; G05D 7/0688; Y02A 10/40; Y02A 20/20
See application file for complete search history.

(56) References Cited

U.S. PATENT DOCUMENTS

| | | | | |
|---|---|---|---|---|
| 9,772,609 | B2* | 9/2017 | Goodman | G05B 13/04 |
| 10,126,733 | B2* | 11/2018 | Suzuki | G06Q 10/00 |
| 2003/0078901 | A1* | 4/2003 | Coppola, Jr. | G01V 9/02 706/21 |
| 2003/0236649 | A1* | 12/2003 | Kodukula | C02F 1/008 702/188 |
| 2004/0156681 | A1* | 8/2004 | Aughton | E02B 13/00 405/84 |
| 2005/0022583 | A1 | 2/2005 | Weigel | |
| 2016/0378123 | A1* | 12/2016 | Montestruque | G05B 15/02 700/282 |
| 2018/0164272 | A1 | 6/2018 | Han et al. | |
| 2018/0203472 | A1* | 7/2018 | Dolezilek | G05D 7/0641 |
| 2019/0354873 | A1 | 11/2019 | Pescarmona | |
| 2021/0355007 | A1* | 11/2021 | Pooi | G06N 3/08 |

FOREIGN PATENT DOCUMENTS

| | | | | |
|---|---|---|---|---|
| CN | 111597619 | A * | 8/2020 | |
| CN | 110446984 | B * | 12/2022 | ............ C02F 1/006 |
| EP | 0708390 | A2 | 4/1996 | |
| EP | 3336425 | A1 | 6/2018 | |
| JP | 2006-315004 | A | 11/2006 | |
| KR | 1020100127751 | A | 12/2010 | |
| WO | WO-2015033269 | A1 * | 3/2015 | ........... A01G 25/167 |
| WO | WO-2018165349 | A1 * | 9/2018 | ............ C02F 1/006 |

OTHER PUBLICATIONS

Zhiliang Ding, Changde Wang, Guangming Tan, Guanghua Guan, The Application of the Fuzzy Self-Adaptive PID Controller to the Automatic Operation Control of Water Transfer Canal System, 2009, 4 pages (Year: 2009).*

Abhiram Mullapudi, Matthew Bartos, Brandon Wong, and Branko Kerkez, Shaping Streamflow Using a Real-Time Stormwater Control Network, Jul. 13, 2018, 11 pages (Year: 2018).*

International Search Report and Written Opinion of International Application No. PCT/US2021/015593 mailed on May 24, 2021, 10 Pages.

* cited by examiner

| Cascade Levels | Initial Distant Flow Condition Attribute Value Obtained from Neural Network 140 Shown In Figure 2 | Simultaneous Output from Cascade Treatment Processor 354 Shown in Figure 3 After a Cascading Event |
|---|---|---|
| 1 | Q1 | Q1 ~ Q1p = Q1' |
| 2 | Q2 | Q2 ~ Q2p = Q2' + Q1" |
| 3 | Q3 | Q3 ~ Q3p = Q3' + Q2" |
| n | Qn | Qn ~ Qnp = Qn' + Q(n-1)" |

FIG. 7

SYSTEMS AND METHODS RELATING TO EFFECTIVE MANAGEMENT OF FLUID INFRASTRUCTURE

RELATED APPLICATION

The application claims priority from U.S. Provisional Application having Ser. No. 62/967,051 filed on Jan. 29, 2020, which is incorporated herein by reference for all purposes.

FIELD

The present teachings generally relate to systems and methods for effective management of fluid infrastructure. More particularly, the present teachings relate to fluid managing, collecting and/or conveying systems and methods that implement a system wide cascading scheme to effect fluid management based upon accurately predicted values of flow or hydrological parameters that characterize the fluid infrastructure.

BACKGROUND

A sewer and/or wastewater treatment infrastructure collects, transports, treats and/or dispenses water. To accomplish this, the sewer and/or wastewater treatment infrastructure may include a network of interconnected trunk lines or pipes for directing fluid flow within it. Additionally, the infrastructure may include various components to treat and/or store the fluid. Managing complicated infrastructure arrangements of these components poses unique challenges that remain unsolved in the current state of the art.

What are, therefore, needed are novel systems and methods that are employed for effective fluid infrastructure management.

SUMMARY

To achieve the foregoing, the present teachings provide novel systems and methods for effective management of fluid infrastructure, i.e., infrastructure for collection and conveyance of fluids. The present systems and methods rely on novel arrangements of components used in water collection and conveyance systems and methods, to control transport, store and treat fluid streams.

In preferred embodiments of the present systems and methods described herein, a hierarchical arrangement of different cascade levels is implemented to manage the fluid infrastructure. In this arrangement, fluid flow begins from a first cascade level, disposed at an upstream location, and cascades down to one or more subsequent cascade levels that are serially coupled and disposed at downstream locations. The fluid management at each of the subsequent cascade levels is facilitated by a fluid treatment facility that serves as a distant fluid treatment facility to a previous cascade level. In this configuration, the previous cascade level immediately precedes the subsequent cascade level.

In one aspect, the present arrangements provide fluid stream management systems. One such exemplar system includes: (1) one or more downstream processing sub-systems; (2) one or more neural networks; (3) a cascading treatment processor; and (4) multiple fluid flow controllers.

Each of the downstream processing sub-systems includes at least one distant fluid treatment facility and further includes: (1) one or more fluid treatment facility sensors; and (2) one or more pre-processing flow sensors. One or more fluid treatment facility sensors are disposed inside one or more of the distant fluid treatment facilities and each such sensor provides a flow condition measurement for each of these distant fluid treatment facilities. The flow condition measurements provide information regarding transport, storage and/or treatment of one or more of the input fluid streams flowing into a distant fluid treatment facility.

One or more pre-processing flow sensors facilitate determination of one or more of the flow condition attribute values of one or more of the input fluid streams, prior to the input fluid streams entering the distant fluid treatment facility.

With respect to neural networks, each such network includes an input layer that is communicatively coupled to one or more of the fluid treatment facility sensors and/or one or more of the pre-processing flow sensors. The input layer is configured to receive the flow condition measurements of one or more of the input fluid streams flowing into the distant fluid treatment facility. The neural network also includes one or more intermediate layers. Based upon one or more of the flow condition measurements, the intermediate layer calculates an initial distant flow condition attribute value that is not a real time value. Finally, the neural network includes an output layer that is capable of outputting the initial distant flow condition attribute value.

A cascading treatment processor communicatively coupled to the output layer and includes or is also communicatively coupled to a hydrological information database that has stored thereon historical hydrological information, uses the initial distant flow condition attribute value to make certain predictions. During a processing operation, the cascading treatment processor, based upon the historical hydrological information obtained from the hydrological information database, predicts one or more predicted modified contribution values and one or more predicted modified flow condition attribute values to further predict a predicted modified total load value for each of the distant fluid treatment facilities.

Each multiple fluid flow controllers are coupled to the cascading treatment processor and is coupled to at least one or more of flow-directing devices such that at least one of the flow-directing devices is associated with at least one of the fluid flow controllers. During an operative state of one or more of the fluid flow controllers, at least one of the fluid flow controllers adjusts fluid flow through at least one of the flow-directing device towards one or more of the distant fluid treatment facilities such that, for each of the distant fluid treatment facilities, a sum of at least one of a real time total load value and at least one of the predicted modified total load value is minimized. The real time total load value of one or more of the distant fluid treatment facilities is based upon measurements obtained from one or more of the distant fluid treatment facility sensors.

In another aspect, the present teachings provide methods for controlling transport of a fluid stream. One such exemplar method includes obtaining, using a distant fluid treatment facility sensor disposed inside a distant fluid treatment facility, a flow condition measurement. Next, the exemplar method proceeds to arriving at, using one or more pre-processing flow sensors, a distant pre-processing flow condition attribute value for one or more of the input fluid streams entering the distant fluid treatment facility.

Then, a calculating step is carried out using a neural network and based upon the flow condition measurement. This step, specifically, involves calculating an initial distant flow condition attribute value which is not a real time value.

Following this calculation, the exemplar method proceeds to predicting, based upon the initial distant flow condition attribute value and the distant pre-processing flow condition attribute value, a predicted modified flow condition attribute value and a predicted modified contribution value for each of the input fluid streams entering the distant fluid treatment facility. The predicted modified flow condition attribute value accounts for changes, as a function of time, in the initial distant slow condition attribute value of the distant fluid treatment facility and/or of one or more of the input fluid streams entering the distant fluid treatment facility. Further, the predicted modified contribution value accounts for flow condition contribution of each of the input fluid streams flowing into the distant fluid treatment facility.

The exemplar method relies upon a cascading treatment processor and previously calculated values of the predicted modified flow condition attribute value and the predicted modified contribution value—for further computation. At this stage, the cascading treatment processor computes a predicted modified total load value of the distant fluid treatment facility. The predicted modified total load value is a sum of individual products of the predicted modified contribution value and the predicted modified fluid condition attributes value associated with the input fluid stream and such individual products are obtained for each of the input fluid streams flowing into the distant fluid treatment facility.

The exemplar method is, at this stage, prepared to carry out training of the cascading treatment processor to minimize a sum, computed for the distant fluid treatment facility, of predicted modified total load value at certain instances in time and a real time total load value. The real time load value is obtained from operation of the distant fluid treatment facility sensor at the same instances in time.

The system and method of operation of the present teachings and arrangements, however, together with additional objects and advantages thereof, will be best understood from the following descriptions of specific embodiments when read in connection with the accompanying figures.

BRIEF DESCRIPTION

Figure 4:
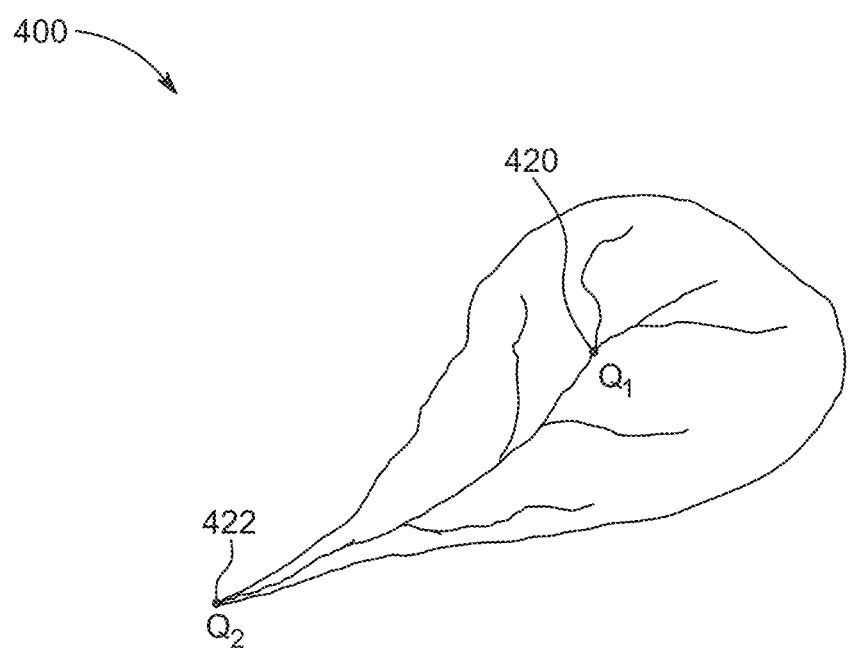
FIG. 4 shows a hierarchical arrangement of different cascade levels, according to one embodiment of the present teachings, applied to the infrastructure of FIG. 1, such that a flow beginning at a first cascade level, located upstream, cascades down to subsequent cascade levels that are serially coupled and located downstream.
Figure 5:
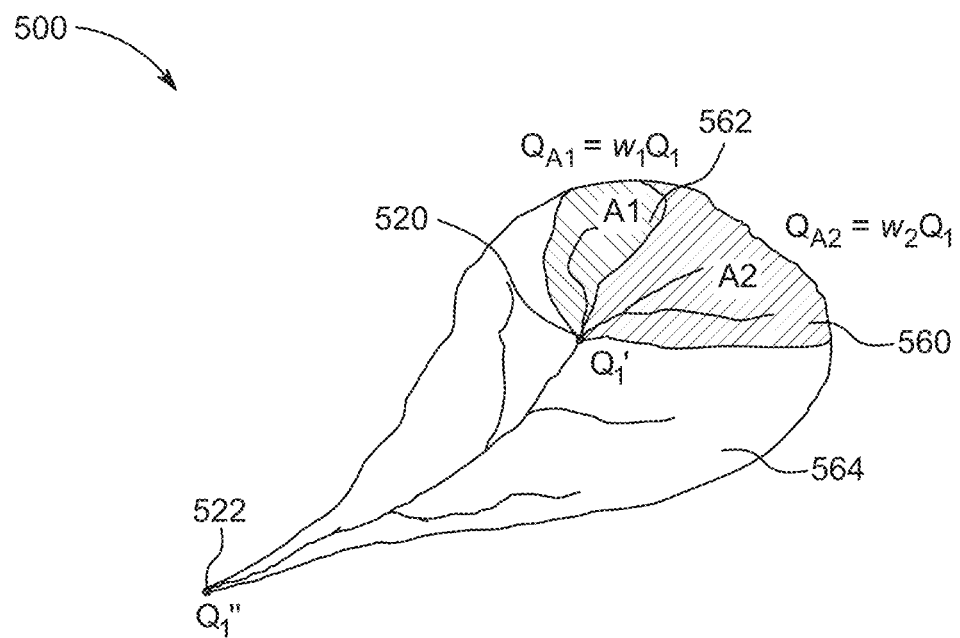

FIG. 5 shows the hierarchical arrangement shown in FIG. 4, in which the first cascade level is partitioned, according to one embodiment of the present teachings, into sources of input fluid streams flow into a first fluid treatment facility at a first cascade level, and also shows that, after a cascading event, the entire volume of fluid flowing into the first fluid treatment facility eventually (i.e., as a function of time) flows into a second fluid treatment facility at the second cascade level.

Figure 6:
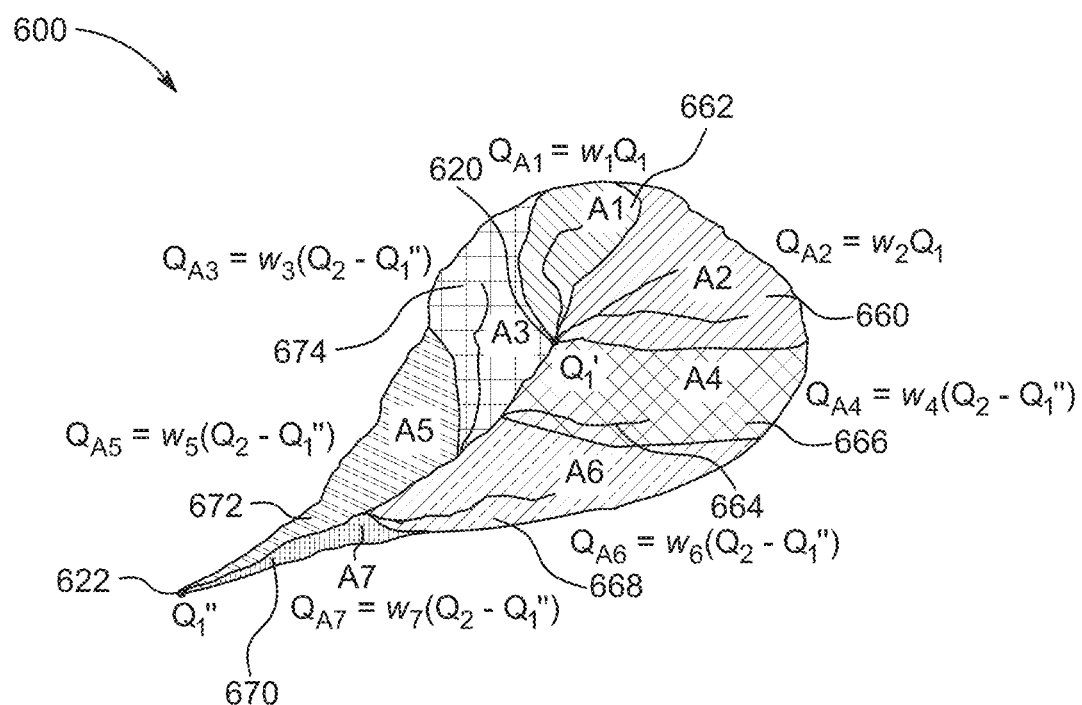

FIG. 6 shows the hierarchical arrangement of FIG. 5, in which the second cascade level is partitioned, according to one embodiment of the present teachings, into its respective sources of input fluid streams, the flow condition contribution values of which are modified as a result of flow from the first fluid treatment facility to the second fluid treatment facility.

Figure 3:
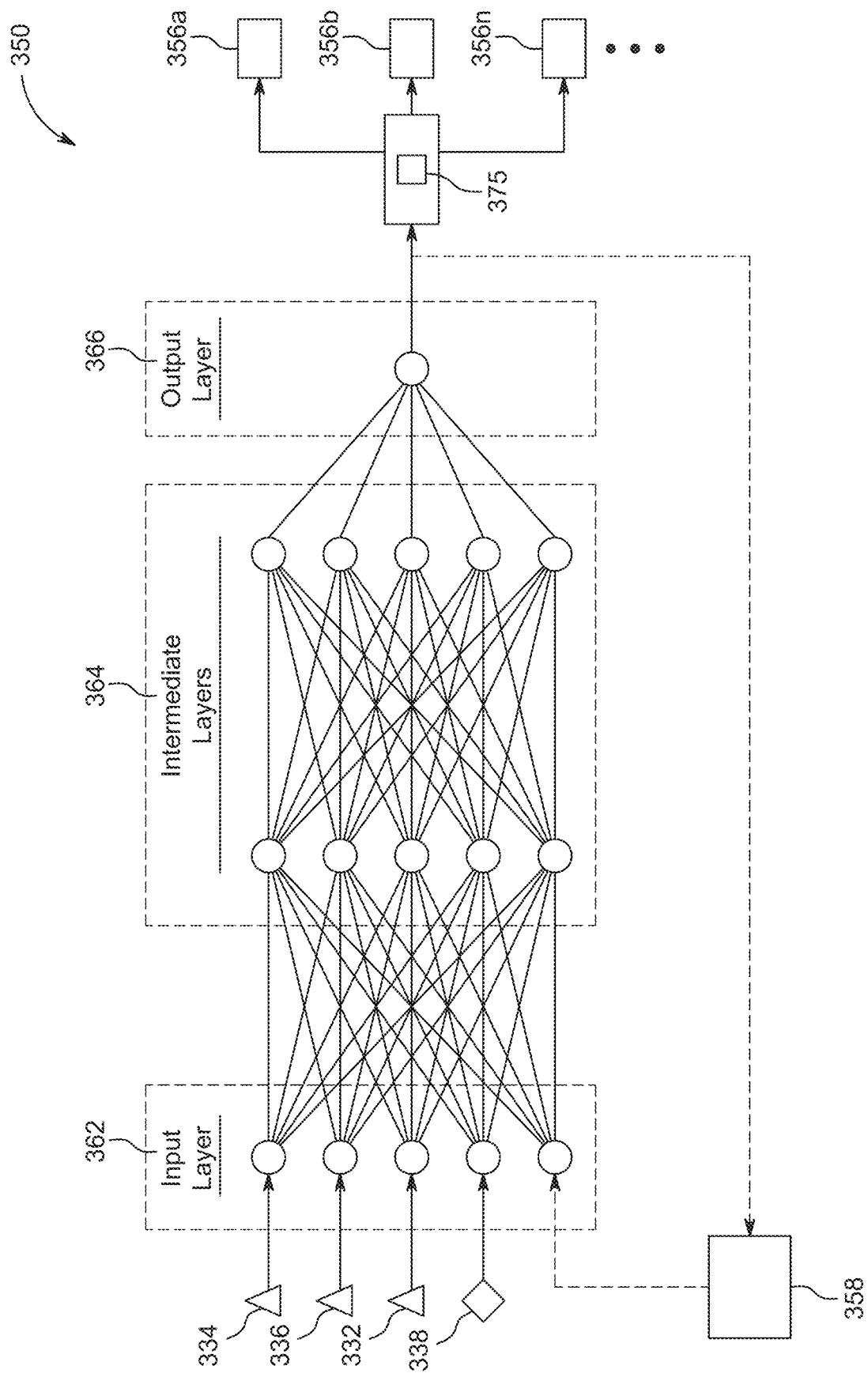
FIG. 3 shows a block diagram of a fluid management system, according to one embodiment of the present arrangements, for managing the infrastructure of FIG. 1 and including a neural network coupled to cascading treatment processor.

FIG. 7 shows a table, according to one embodiment of the present teachings, showing the values obtained from the neural network and the cascading treatment processor shown in FIG. 3.

Figure 8:
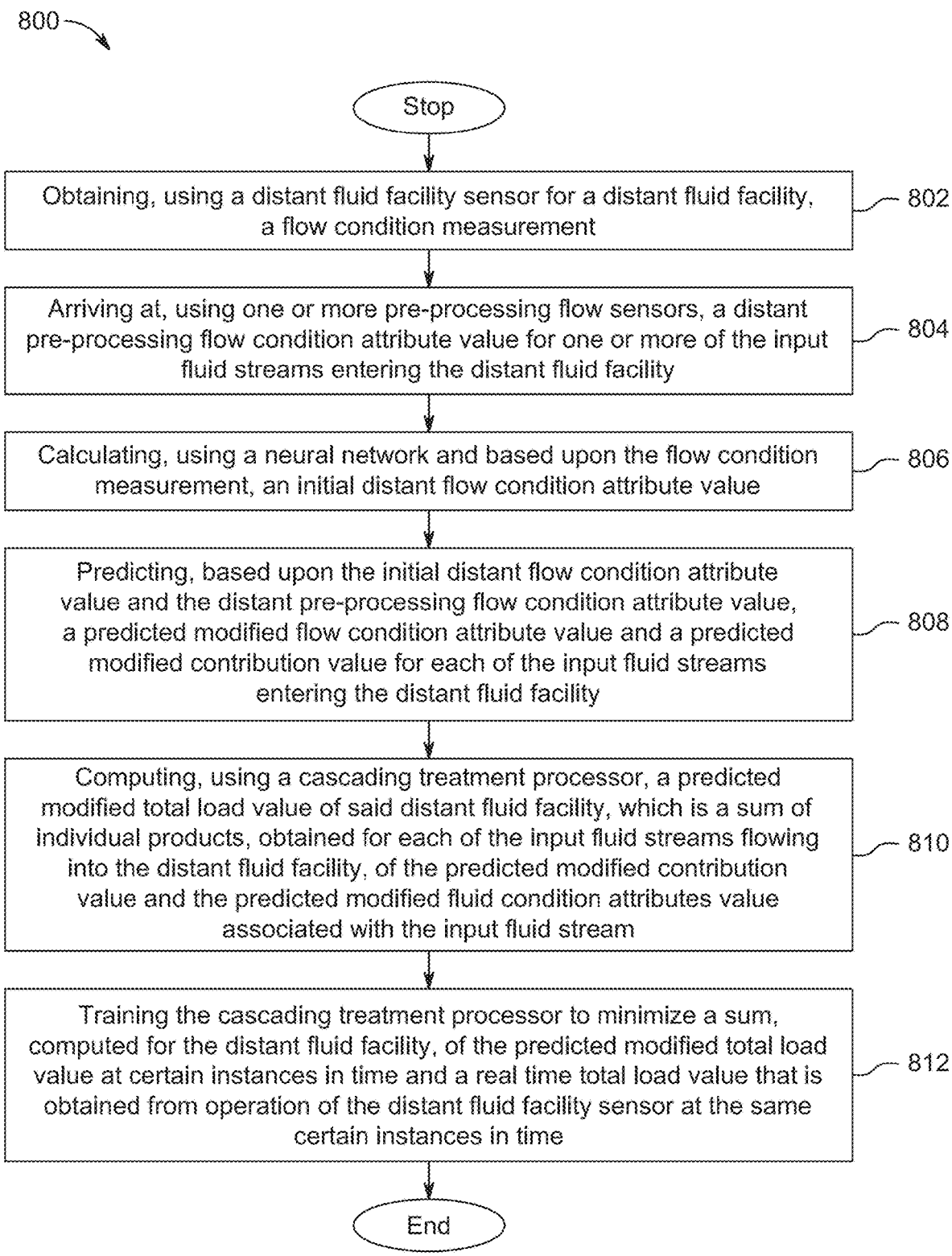

FIG. 8 shows a fluid management method, according to one embodiment of the present teachings, for managing different types of fluid infrastructures.

DETAILED DESCRIPTION

In the following description, numerous specific details are set forth in order to provide a thorough understanding of the present teachings and arrangements. It will be apparent, however, to one skilled in the art that the present teachings and arrangements may be practiced without limitation to some or all of these specific details. In other instances, well-known process steps have not been described in detail in order to not unnecessarily obscure the present teachings and arrangements.

Figure 1:
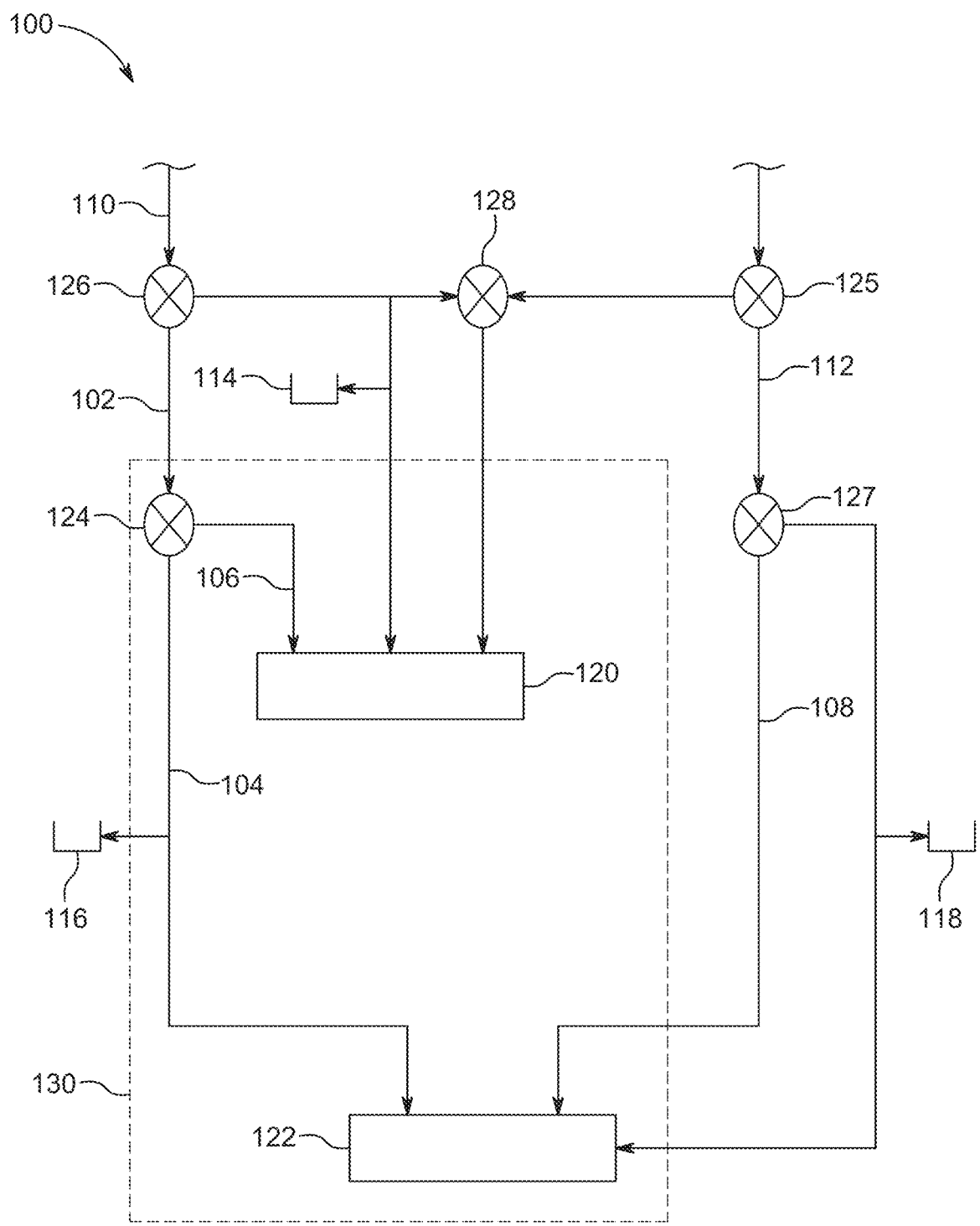
FIG. 1 shows a schematic of a sewer and/or a wastewater treatment infrastructure, according to one embodiment of the present arrangements, including one or more trunk lines, fluid flow-directing devices ("flow-directing device"), and fluid treatment facilities for treating, storing and/or transporting fluid to or inside the sewer and/or wastewater treatment infrastructure.

FIG. 1 shows a fluid infrastructure 100 for transporting, storing and/or treating fluid (e.g., wastewater and precipitation). Infrastructure 100 includes one or more trunk lines or pipes, e.g., trunk lines or pipes 102, 104, 106, 108, 110, and 112, that transfer fluid between various components, which are coupled to one or both ends of each trunk line. Other components inside infrastructure 100 may include one or more fluid treatment facilities 114, 116, 118, 120, and 122. One or more of these fluid treatment facilities may be of a first type 114, 116, 118 (e.g., a tank) or may be of a second type 120, and 122 (e.g., wastewater treatment plant). Infrastructure 100 may also include one or more fluid flow directing devices (hereinafter "flow-directing devices") 124, 125, 126, 127, and 128. The combination of one or more trunk lines 102, 104, 106, 108, 110, and 112, one or more flow-directing devices 124, 125, 126, 127, 128, and one or more fluid treatment facilities 114, 116, 118, 120, and 122 allows sewer system 100 to transport fluid throughout and different parts of infrastructure 100 for transportation, storage and/or treatment.

By way of example, an effluent fluid stream from trunk line 102 is received at flow-directing device 124. Further, at the flow-directing device 124, the fluid stream is directed to any one or both of downstream trunk lines 104 and 106 that ultimately convey one or more fluid streams to one or both of fluid treatment facilities 122 and 120, respectively. These fluid treatment facilities are designed to process, e.g., transport, store and treat, the fluid streams that they receive and their ability to process varies with time.

Moreover, each of these fluid treatment facilities has varying processing capacities relative to each other. For example, fluid treatment facility 122 may be able to treat a larger volume of fluid than fluid treatment facility 120 at a given instance in time. In connection with a fluid treatment facility, the term "load value," as used herein, conveys a measure of utilization capacity available for a per unit volume of fluid to be processed at the fluid treatment facility.

Figure 2:
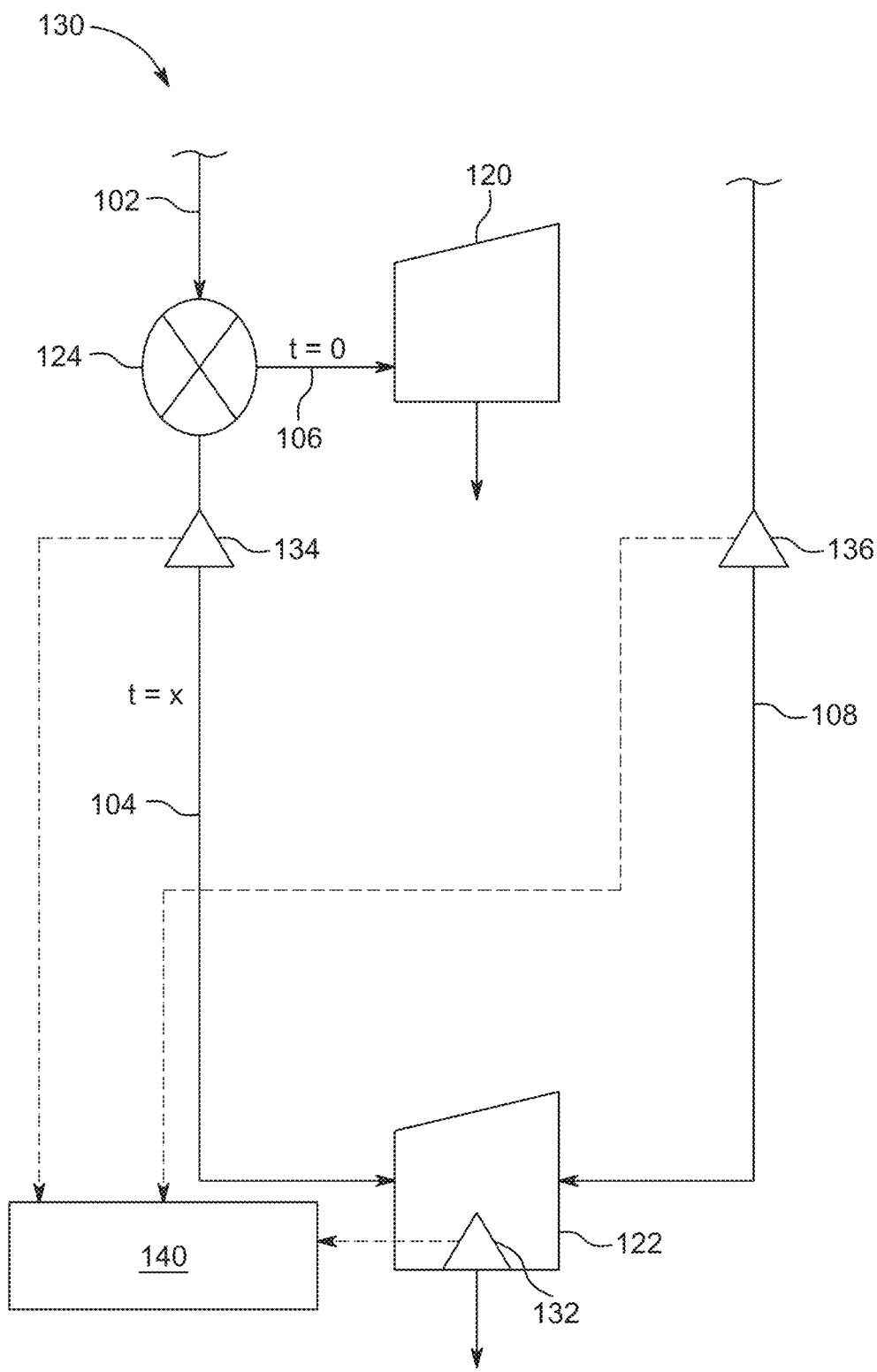
FIG. 2 shows a schematic of a portion of the infrastructure of FIG. 1 including one or more pre-processing flow sensors for arriving at a distant pre-process flow condition attribute value and one or more distant fluid treatment facility sensors for obtaining a distant fluid condition attribute value.

FIG. 2 shows, in greater detail, a portion 130 of infrastructure 100 shown in FIG. 1 and that includes flow-directing device 124. According to FIG. 2, flow-directing device 124 is capable of directing fluid to any one or both of fluid treatment facilities 120 and 122 based on the load value of that fluid treatment facility. Fluid treatment facility 120 is in close proximity, relative to fluid treatment facility 122, to flow-directing device 124, and is therefore referred to as a "proximate fluid treatment facility." It may take a time, t, for fluid to flow from flow-directing device 124 to proximate fluid treatment facility 120 and may be a negligible value, e.g., a few minutes. Conversely, fluid treatment facility 122 is distant from flow-directing device 124, relative to fluid treatment facility 120, and is therefore referred to as a "distant fluid treatment facility," and it takes a time of x value for the fluid released from flow-directing device 124 arrive at distant fluid treatment facility 122. In other words, relative to proximate fluid treatment facility 120, there is a time duration of "x" value between when flow-directing device 124 directs fluid to distant fluid treatment facility 122 and when distant fluid treatment facility 122 receives the fluid. A value of time duration, x, may be in the order of tens or hundreds of minutes.

As explained above, the load value of distant fluid treatment facility 122 changes as a function of time. Such changes in load value may occur depending on the rate of processing of a fluid stream inside distant fluid treatment facility 122, and/or if another fluid stream arrives, at a future instance in time, at distant fluid treatment facility 122 for processing. To explain this further, FIG. 2 shows that distant fluid treatment facility 122 is also capable of processing a fluid stream arriving via trunk line 108 and the fluid stream may be undergoing processing currently and/or at some future instance in time. The present teachings recognize that, when deciding to direct and deciding on the volume to direct a fluid stream to distant fluid treatment facility 122, operation of flow-directing device 124 should be able to account for flow contribution values, as a function of time, from trunk lines 104 and 108 on distant fluid treatment facility 122.

Conventional fluid management systems are simply unable to effectively predict load values for distant fluid treatment facility 122. In sharp contrast, the present teachings and arrangements recognize that specifically monitoring flow condition attribute values of one or more of input fluid streams (e.g., trunk lines 104 and 108) as a function of time allows effective prediction of modified flow condition attribute values for any facility, regardless of whether proximate or distant. Examples of flow condition attributes of a fluid stream include fluid flow rate, fluid level, fluid volume, duration of fluid retention, and fluid quality.

In preferred embodiments, the present teachings use measurements from one or both of pre-processing flow sensor 134 disposed on trunk line 104 and pre-processing flow sensor 136 disposed on trunk line 108, depending on their contribution to the flow condition attribute values of distant facility 122, to compute predicted modified flow condition contribution values and predicted modified total load values of distant facility 122, as explained in connection with FIGS. 7 and 8. As shown in FIG. 3, measurements from pre-processing flow sensor 134 and/or pre-processing flow sensor 136 and distant fluid treatment facility sensor 132 are sent to a neural network 140. However, in other embodiments of the present arrangements, measurements from one or both of these sensors are sent to cascading treatment processor 354 for further processing as will be explained in connection with FIGS. 7 and 8.

It is important to note that the present arrangements may include many variations and the present teachings recognize that the present systems and methods may be implemented by measuring a wide range of properties and/or using a wide range of different components and features. By way of example, at least one of the flow condition attribute value is a value for one attribute selected from a group comprising fluid flow rate, fluid height, fluid volume, hydraulic capacity, time of fluid retention, storage capacity, and fluid quality. As another example, at least one flow-directing device is selected from a group comprising fluid treatment facility, fluid pump station, gate, inflatable dam, weir, and valve. As yet another example, at least one of one or more fluid treatment facilities is selected from a group comprising storage tank, trunk line, fluid treatment plant, holding pool, reservoir, ocean, and river.

In connection with a distant fluid treatment facility sensor and pre-processing flow sensors, the present teachings also recognize use of different types of components. By way of example, the distant fluid treatment facility sensors include at least one sensor selected from a group comprising level sensors, flow meters, thermometer, dissolved oxygen sensor, pH level sensor, conductivity sensor, oxidation reduction potential sensor, *E. coli* count sensor, total organic carbon level sensor, nitrate level sensor, phosphorus level sensor, bacteria count sensor.

As another example, the pre-processing flow sensors include at least one sensor selected from a group comprising level sensors, flow meters, thermometer, dissolved oxygen sensor, pH level sensor, conductivity sensor, oxidation reduction potential sensor, *E. coli* count sensor, total organic carbon level sensor, nitrate level sensor, phosphorus level sensor, bacteria count sensor.

In one embodiment of the present arrangements, two or more flow-directing devices are arranged sequentially such that the second flow-directing device that is located downstream from the first flow-directing device. In this configuration, the second flow-directing device is deemed a "distant fluid treatment facility" by the cascading treatment processor when predicting one or more predicted modified contribution values and a predicted modified total load value for the distant fluid facility (operating in each cascade level in the fluid infrastructure, which is explained in greater detail with respect to FIGS. 4, 5, 6, 7 and 8).

In one embodiment of the present arrangements, pre-processing flow sensors 134 and 136 are located equidistant from distant fluid treatment facility 122. Although such condition of equidistant placement of these sensors from distant fluid treatment facility 122 is not necessary, equidistant placement of sensors allows neural network 140 to more easily account for different future conditions, when different input fluid streams (conveyed using trunk lines 104 and 108) simultaneously arrive, an appreciable time later after being directed by flow-directing device 124, at distant fluid treatment facility 122.

FIG. 3 shows a block diagram of a fluid management system 350, according to one embodiment of the present arrangements, for managing sewer and/or a wastewater treatment system 100 shown in FIG. 1. Fluid management system 350 includes a neural network, which is substantially similar to neural network 140 shown in FIG. 2 and comprises an input layer 362, an intermediate layer 364 and an output layer 366. Further, input layer 362 is communicatively coupled to one or more sensors, such as a distant fluid treatment facility sensor 332, pre-processing flow sensors 334 and 336, each of which is substantially similar to their counterparts shown in FIG. 2, i.e., distant fluid treatment facility sensor 132, pre-processing flow sensors 134 and 136. Distant fluid treatment facility sensors 332 measure and provide to the neural network-flow condition measurements for a distant fluid treatment facility (e.g., distant fluid treatment facility 122 of FIG. 1). Each of pre-processing flow sensors 334 and 336 measures and provides to the neural network and/or a cascading treatment processor-pre-processing flow condition attribute values of the different input feed streams (e.g., trunk lines 104 and 108) entering the distant fluid treatment facility (e.g., distant fluid treatment facility 122 of FIG. 1).

Input layer 362 receives these flow condition measurements and intermediate layer 364 calculates an initial distant flow condition attribute value, which is conveyed from intermediate layer to an output layer 366. Using a coupling between output layer 366 and cascading treatment processor 354, the initial distant flow condition attribute value is conveyed from output layer 366 to cascading treatment processor 354 for further processing.

Cascading treatment processor 354 calculates a predicted modified flow condition attribute value and a predicted modified contribution value using the initial distant flow condition attribute value and pre-processing flow condition attribute values of the different input feed streams flowing into the distant fluid treatment facility (e.g., distant fluid treatment facility 122 of FIG. 1). The predicted modified flow condition attribute value accounts for changes in the initial distant slow condition attribute value, as a function of time, of the distant fluid treatment facility and/or of one or more of the input fluid streams (e.g., trunk lines 104 and 108 shown in FIG. 1) entering the distant fluid treatment facility (e.g., distant fluid treatment facility 122 of FIG. 1). In the context of FIGS. 1 and 2, the predicted modified flow condition attribute value is a predicted flow condition attribute value at a future instance in time, when t x, where "x" is a future time value when one or more particular input fluid streams, e.g., trunk line 104 and/or trunk line 108, arrive at distant fluid treatment facility 122 for processing. This is one example of how the predicted modified flow condition attribute value serves as a measure of changes affecting processing at distant fluid treatment facility 122 in a time period between a time when flow-directing device 124 and/or 127 directs an input fluid stream, e.g., trunk line 104 and/or trunk line 108, respectively, towards distant fluid treatment facility 122 and a time when the input fluid stream arrives at distant fluid treatment facility 122.

The predicted modified contribution value accounts for flow condition contribution of each of the input fluid streams (e.g., trunk lines 104 and 108 shown in FIG. 1) flowing into the distant fluid treatment facility (e.g., distant fluid treatment facility 122 of FIGS. 1 and 2). As explained in connection with FIG. 8, predicted modified contribution value is a time-dependent variable. In certain embodiments of the present teachings, the predicted modified flow condition attribute value and/or the predicted modified contribution are calculated by the neural network, as opposed to being calculated in cascading treatment processor 354.

Regardless of the calculation location of the predicted modified flow condition attribute value and/or the predicted modified contribution value, cascading treatment processor 354 calculates a predicted modified total load value of the distant fluid treatment facility. The predicted modified total load value is a sum of individual (mathematical) products, obtained for each of the input fluid streams (e.g., trunk lines 104 and 108 shown in FIGS. 1 and 2) flowing into distant fluid treatment facility (e.g., distant fluid treatment facility 122 shown in FIGS. 1 and 2), of the predicted modified contribution value and the predicted modified flow condition attribute value calculated for each of the input fluid streams. The cascading treatment processor 354 undergoes training, preferably using a training engine contained therein, to minimize a sum, computed for the distant fluid treatment facility. This sum is of the predicted modified total load value at certain instances in time and a real time total load values, obtained from operation of the distant fluid treatment facility sensor (e.g., distant fluid treatment facility sensor 132 shown in FIG. 2) at the same instances in time.

In another embodiment of the present arrangements, the neural network shown in FIG. 3 also receives weather forecast information from a weather forecast information provider 338 (e.g., National Oceanic and Atmospheric Administration). Weather forecast information provided to the neural network shown in FIG. 3 includes at least one weather related information value selected from a group comprising precipitation, temperature, humidity, and atmospheric pressure. Preferably, the weather-related information received at the neural network shown in FIG. 3 includes statistical information such as mean, standard deviation, and probability distribution function for the weather-related information of precipitation, temperature, humidity, and atmospheric pressure. Weather-related information, by way of example, allows the neural network shown in FIG. 3 to anticipate increased fluid flow into a fluid treatment facility, such as distant fluid treatment facility 122 shown in FIGS. 1 and 2, due to rainfall runoff. According to the present teachings, this would reduce the available utility capacity of distant fluid treatment facility 122 shown in FIGS. 1 and 2. As a result, weather forecast information is used in the prediction of the predicted modified flow condition attribute value and/or the predicted modified contribution value.

As shown in FIG. 3, cascading treatment processor 354 is coupled to multiple fluid flow controllers 356a, 356b . . . 356n, each of which is coupled to a flow-directing device (e.g., flow-directing device 124 or 127 shown in FIG. 2). In their operative state, each of fluid flow controllers 356a, 356b . . . 356n adjusts fluid flow through their respective flow-directing device to minimize a sum, for their respective distant fluid treatment facility, of the predicted modified total load value at certain instances in time and the real time total load values, obtained from operation of the distant fluid treatment facility sensor at the same instances in time.

In preferred implementations of the present teachings, the fluid infrastructure 100 shown in FIG. 1 is partitioned into a hierarchical arrangement of different cascade levels such that fluid flow beginning from a first cascade level, disposed at an upstream location, cascades down to one or more subsequent cascade levels that are serially coupled and disposed at downstream locations.

FIG. 4 shows a hierarchical arrangement 400, according to one embodiment of the present teachings, of infrastructure 100 of FIG. 1. In FIG. 4, hierarchical arrangement 400 shows two fluid treatment facilities 420 and 422, which are substantially similar to fluid treatment facilities 120 and 122 shown in FIGS. 1 and 2. Fluid treatment facility 120 has an initial distant flow condition attribute value, denoted by "$Q_1$," and fluid treatment facility 122 has an initial distant flow condition attribute value, denoted by "$Q_2$." Both $Q_1$ and $Q_2$, are preferably calculated by the neural network shown in FIG. 3 and as discussed above.

In hierarchical arrangement 400, sewer and/or a wastewater treatment system 100 of FIG. 1 is shown stripped off all the components that contribute to input fluid streams flowing into the different fluid treatment facilities (e.g., fluid treatment facilities 120 and 122 shown in FIG. 1). In other words, the infrastructure is designed to process storm water and the runoff generating components for all catchments or sewer-sheds are stripped off in FIG. 4.

FIG. 5 shows a hierarchical arrangement 500, which is substantially similar to hierarchical arrangement 400 shown in FIG. 4, except in hierarchical arrangement 500, the first cascade level is partitioned, according to one embodiment of the present teachings, into two input fluid streams processed at a fluid treatment facility 520. In the context of fluid infrastructure 100 shown in FIG. 1, two input fluid streams A1 and A2 shown in FIG. 4, which may be thought of as representations of trunk lines 104 and 108 shown in FIG. 1, respectively, and their respective catchments or sub-catchments are partitioned into partitions 560 and 562 as shown in FIG. 4. Regardless of the context, an initial distant flow condition attribute value, $Q_1$, calculated for fluid treatment facility 530, is shown by the expressions:

$$Q_1 = Q_{A1} + Q_{A2} \quad \text{(Equation 1)}$$

wherein in Equation 1, $Q_{A1} = W_1 * Q1$ and $Q_{A2} = W_2 * Q2$. Further, "$Q_{A1}$" represents a flow condition attribute value for an input fluid stream denoted by "A1," "$Q_{A2}$" represents a flow condition attribute value for an input fluid stream denoted by "A2," "$w_1$" represents a flow condition attribute value for an input fluid stream denoted by "A1," and "$w_2$" represents a flow condition attribute value for an input fluid stream denoted by "A2."

However, there is another significant difference between hierarchical arrangements 400 and 500-hierarchical arrangement 500 shows a scenario that occurs after a cascade event, in which fluid flows from first fluid treatment facility 520 to second fluid treatment facility 522, or a "distant fluid treatment facility." As a result, an initial distant flow condition attribute value, $Q_1$, is modified. By way of example, a flow-directing device (e.g., flow-directing device 124 of FIG. 2) operating in the first cascade level operates to convey fluid flow from fluid treatment facility 520 to distant fluid treatment facility 522 that is processing fluid streams in the second cascade level.

As explained above in connection with FIG. 3, using a distant fluid treatment facility sensor (e.g., distant fluid treatment facility sensor 332 of FIG. 3) and one or more pre-processing flow sensors (e.g., pre-processing flow sensors 334 and 336 of FIG. 3), modifications to initial distant flow condition attribute value, $Q_1$, are predicted. A resulting time-dependent variable referred to as "predicted modified flow condition attribute" (a numerical value for which is denoted by a representation, "$Q_1'$") for fluid treatment facility 520 describes the flow condition at that facility after the cascading event. For the flow condition at fluid treatment facility 522 operating at the second cascade level, the present teachings recognize that the entire fluid volume of $Q_1'$ flows into fluid treatment facility 522, but as a function of time, t. In connection with FIGS. 1 and 2, $Q_1'$ is predicted for a future instance in time, when t=x, where "x" is a future time value when one or more particular input fluid streams (e.g., trunk line 104 and/or trunk line 108) travel a relatively long distance to arrive at the distant fluid treatment facility 122. In connection with fluid treatment facility 522 of FIG. 5, the flow condition is, therefore, predicted to be $Q_1''$, i.e., the same volume as $Q_1'$, but the volume of $Q_1'$, over a period of time, flows into distant fluid treatment facility 122.

FIG. 5 also shows a second cascade level 564, which is explained in greater detail in FIG. 6 and is substantially similar to a second cascade level 664 shown in FIG. 6.

To this end, FIG. 6 shows a hierarchical arrangement 600, which is substantially similar to hierarchical arrangement 500 of FIG. 5 (i.e., fluid treatment facilities 620, 622, partitions 660 and 662, and a second cascade level are substantially similar to their counterparts of FIG. 5, i.e., fluid treatment facilities 520, 522, partitions 560 and 562 and second cascade level 564), except in hierarchical arrangement 600, second cascade level 664 is partitioned, according to one embodiment of the present teachings, into its different sources of input fluid streams. Each of partitions 666, 668, 670, 672 and 674 include input fluid streams that flow into fluid treatment facility 622 that operates in second cascade level 664. After the cascade event, not only does fluid treatment facility 622 process or treat input fluid streams denoted by "A4," "A6," "A7," "A5" and "A3" from partitions 666, 668, 670, 672 and 674, respectively, but also processes or treats fluid flow from fluid treatment facility 620 operating at the first cascade level. Consequently, fluid flow from fluid treatment facility 620, $Q_1''$, over a period of time, into fluid treatment facility 622 modifies a known initial distant flow contribution value, $Q_2$, which was calculated by the neural network (shown in FIG. 3), before the cascading event, based upon each of the different input fluid streams A3, A4, A5, A6 and A7 flowing into fluid treatment facility 622 and in the absence of flow from fluid treatment facility 620. After the cascading event, a cascading treatment processor, such as the one shown in FIG. 3, calculates a predicted modified flow condition attribute value, i.e., predicts, as a function of time $Q_2$-$Q_1''$ for each of the input fluid streams A3, A4, A5, A6 and A7 flowing into fluid treatment facility 622. As shown in FIG. 6, for each of partitions 666, 668, 670, 672 and 674, the expressions are $Q_{A3} = W_3 * (Q_2 - Q_1'')$, $Q_{A4} = W_4 * (Q_2 - Q_1'')$, $Q_{A5} = W_5 * (Q_2 - Q_1'')$, $Q_{A6} = W_6 * (Q_2 - Q_1'')$ and $Q_{A7} = W_7 * (Q_2 - Q_1'')$, respectively. At fluid treatment facility 622, the predicted modified flow condition attribute value, $Q_2' = Q_{A3} + Q_{A4} + Q_{A5} + Q_{A6} + Q_{A7}$. As will be explained below, by approximating the predicted modified flow condition attribute value, $Q_2$-$Q_1''$, to a hydrologically obtained flow contribution value undergoing real time processing at the fluid treatment facility allows for a more accurate prediction of the predicted modified contribution values, w.

FIG. 7 shows a computation table, according to one preferred embodiment of the present teachings, for a total of "n" number of cascade levels in the present hierarchical arrangements. For n number of cascade levels, the neural network computes the initial distant flow contribution value for each level, i.e., $Q_1$, $Q_2$, $Q_3$ . . . $Q_n$. Correspondingly, a cascading treatment processor (e.g., cascading treatment processor 354 of FIG. 3) computes $Q_1'$, $Q_1''$ (which is merely a time dependent variable based upon $Q_1'$) for the first cascade level and Qu'is equal to "Q1p," which represents a real time flow contribution value, i.e., undergoing real time processing at the fluid treatment facility of the first cascade level, and is hydrological information. Further, $Q_1$, which is obtained from the neural network, is set to equal or approximately equal Q1p, a real time value. Accordingly, for the first cascade level, FIG. 7 shows that the cascading treatment processor calculates the expression Q1~Q1p=Q1'. Similarly, for the second cascade level, the cascading treatment processor calculates the expression Q2~Q2p=Q2'+Q1" and for the third cascade level, the cascading treatment processor calculates the expression Q3~Q3p=Q3'+Q2". Finally, for the last cascade level, i.e., the nth cascade level, the cascading treatment processor calculates the expression Qn~Qnp=Qn'+Q(n−1)". Thus, the cascading treatment processor sets up an iteration scheme for each cascade level in a hierarchical arrangement, wherein the iteration scheme uses hydrological information, i.e., Q1p, Q2p, Q3p . . . Qnp to more accurately predict the predicted modified flow condition attribute values and the predicted modified contribution values. It is important to note that these outputs of the cascading treatment processor shown in FIG. 7 are calculated simultaneously, and not calculated serially.

A training engine loaded on cascading treatment processor (e.g., loaded on cascading treatment processor 354 shown in FIG. 3) is, preferably, configured to implement the iteration scheme each cascade level present in the fluid infrastructure. In this iteration scheme, a summation expression, $\Sigma w_k*(Q_i-Q_{i-1}"(t))$ is advanced using time dependent values of $Q_{i-1}"(t)$ and $w_k$ until a resulting value of each summation expression converges to and/or is approximately equal to a real time flow condition attribute value of the distant fluid treatment facility for each cascade level in the fluid infrastructure. Each summation expression accounts for the time dependent volumetric contribution by each of the input fluid streams flowing into the distant fluid treatment facility. In this summation expression, "k" is a number that identifies an input fluid stream and ranges from 1 to r, which value represents a total number of input fluid streams flowing into the distant fluid treatment facility for a particular cascade level, "j" identifies the particular cascade level and is a number that ranges from 1 to n, which value represents a total number of the cascade levels present in the hierarchical arrangement, "$Q_1$" is, preferably, obtained from the neural network and is the initial distant flow condition attribute value for the distant fluid treatment facility, and "$Q_{i-1}"(t)$" represents the pre-processing flow condition attribute value, which is a time dependent variable informing on modifications to said initial distant flow condition attribute value for the distant fluid treatment facility.

In certain embodiments of the present arrangements, at least one of the fluid flow controllers (e.g., fluid flow controllers 356a, 356b . . . 356n of FIG. 3) is a proportional-integral-derivative controller that is configured to compute:

$$(K_p Xe)+(K_i X \text{integral}[0,t](e))+(K_d \, de/dt) \quad \text{(Equation 2)}$$

In Equation 2, "$K_p$" is a proportional constant, "$K_i$" is an integral constant, "$K_d$" is a derivative constant, and "e" equals the difference between the real time total load value of at least one of the distant fluid treatment facility and at least one of the predicted modified total load value of the distant fluid treatment facility.

In one embodiment of the present arrangements, in which the input layer of the neural network is coupled to a weather forecast information provider, the cascading treatment processor also receives weather forecast information to include in its calculations. The hydrological information database (e.g., the hydrological information database 375 of FIG. 3), that provides information to the cascading treatment processor, preferably, has stored thereon real time measurements obtained from the distant fluid treatment facility sensor.

Like the cascading treatment processor, the neural network is also coupled to a database. Specifically, as shown in the preferred embodiment of FIG. 3, a fluid management memory (e.g., fluid management memory 358 of FIG. 3) is coupled to the output layer and the input layer of the neural network and has stored thereon one or more of the initial distant fluid condition attribute values, which may be obtained from the output layer and, in this configuration, these values may be subsequently conveyed from the output layer to the input layer. During an operative state of the fluid management memory, which may be coupled to the input layer and one or more of the fluid treatment facility sensors and/or one or more of the pre-processing flow sensors, the historical fluid condition attribute values, previously obtained from one or more of the fluid treatment facility sensors and/or one or more of the pre-processing flow sensors, are provided to the input layer of the neural network for computation purposes.

The present teachings provide methods for managing and/or controlling transport of a fluid stream and need not be implemented using the present arrangements described herein. However, preferred embodiments of the present methods are implemented using the described present arrangements. FIG. 8 shows a flowchart for a method for controlling transport of a fluid stream 800, according to one embodiment of the present teachings.

Method 800, preferably begins with a step 802, which involves obtaining, using a distant fluid treatment facility sensor (e.g., distant fluid treatment facility sensor 132 shown in FIG. 1) for a distant fluid treatment facility (e.g., distant fluid treatment facility 122 shown in FIG. 1), a flow condition measurement (e.g., fluid flow rate, fluid height, fluid volume, hydraulic capacity, time of fluid retention, storage capacity, and fluid quality). Next, method 800 proceeds to a step 804, which includes arriving at, using one or more pre-processing flow sensors (e.g., pre-processing flow sensors 134 and 136 shown in FIG. 2), a distant pre-processing flow condition attribute value for one or more of the input fluid streams entering the distant fluid treatment facility.

Then a step 806 is carried out. This step involves calculating, using a neural network and based upon the flow condition measurement, an initial distant flow condition attribute value (e.g., for the first cascade level, initial distant flow condition attribute value of $Q_1$ and for the nth cascade level, initial distant flow condition attribute value of $Q_n$), which is not a real time value.

Method 800 then proceeds to a step 808, which involves predicting, based upon the initial distant flow condition attribute value and the distant pre-processing flow condition attribute value, a predicted modified flow condition attribute value and a predicted modified contribution value for each of the input fluid streams entering the distant fluid treatment facility. The predicted modified flow condition attribute value accounts for changes, as a function of time, in the initial distant slow condition attribute value of the distant fluid treatment facility and/or of one or more of the input fluid streams entering the distant fluid treatment facility. Further, the predicted modified contribution value accounts for flow condition contribution of each of the input fluid streams flowing into the distant fluid treatment facility.

Next, a step 810 includes computing, using a cascading treatment processor, a predicted modified total load value of the distant fluid treatment facility. The predicted modified total load value is a sum of individual products of the predicted modified contribution value and the predicted modified fluid condition attributes value associated with an input fluid stream and such individual products are obtained for each of the input fluid streams flowing into the distant fluid treatment facility.

Then, a step 812 includes training the cascading treatment processor to minimize a sum, computed for the distant fluid treatment facility, of predicted modified total load value at certain instances in time and a real time total load value that is obtained from operation of the distant fluid treatment facility sensor at the same instances in time.

In preferred embodiments of the present teachings, method 800 further includes a step of partitioning a fluid infrastructure into a hierarchical arrangement of different cascade levels such that fluid flow beginning from a first cascade level, disposed at an upstream location, cascades down to one or more subsequent cascade levels that are serially coupled and disposed at downstream locations. In the cascade configuration, fluid management at each of the subsequent cascade level is facilitated by a fluid treatment facility that serves as the distant fluid treatment facility to a previous cascade level. Further, the previous cascade level immediately precedes the subsequent cascade level.

For each cascade level in the fluid infrastructure, step 804 includes using measurement representations, obtained from one or more of the pre-processing flow sensors or obtained from the neural network, as input into the cascading treatment processor to arrive at the pre-processing flow condition attribute value for each of the input fluid stream entering the distant fluid treatment facility. In one embodiment, step 804 of the present teachings is carried out by an intermediate layer of the neural network.

In a preferred embodiment of the present teachings, step 808 predicts a value of an expression, $Q_i-Q_{i-1}''(t)$ for each cascade level present in the fluid infrastructure. In this expression, "j" identifies a particular cascade level and is a number that ranges from 1 to n, which value represents a total number of the cascade levels present in the fluid infrastructure. Further, "$Q_i$", in the expression, is obtained from the neural network and represents the initial distant flow condition attribute value for the distant fluid treatment facility. Finally, "$Q_{i-1}''(t)$," in the expression, represents the pre-processing flow condition attribute value, which is a time dependent variable informing on modifications to the initial distant flow condition attribute value for the distant fluid treatment facility.

Continuing with step 808, the step of predicting, preferably, includes calculating a time-dependent variable, $w_k$, which represents the predicted modified contribution value of a particular input fluid stream flowing into the distant fluid treatment facility. In this variable, "k" is a number that identifies the particular input fluid stream and ranges from 1 to r, which value represents a total number of input fluid streams flowing into the distant fluid treatment facility. The predicting in step 808 may be carried out using one member chosen from a group comprising the cascading treatment processor, the neural network and another neural network. Step 808 is performed for each cascade level in the fluid infrastructure.

In preferred embodiments of step 808, the predicted modified total load value of the present teachings is represented by a summation expression, $\Sigma w_k*(Q_i-Q_{i-1}''(t))$, which is computed for all values of "k," ranging from 1 to r. This expression accounts for time dependent volumetric contribution by each of the input fluid streams flowing into the distant fluid treatment facility. Moreover, the summation expression is computed for each cascade level present in the fluid infrastructure.

In preferred embodiments of the present teachings, computing, in step 810, uses at least one hydrologic parameter or at least one synthetic hydrological parameter that impacts the predicted modified contribution value, represented by $w_k$. In one implementation of these embodiments, at least one parameter or at least one synthetic hydrologic parameter relates to one member selected from a group comprising area of source of an input fluid stream, characteristic of the source of the input fluid stream, amount of time taken to fully realize a single unit of flow in the input fluid stream, geomorphological characteristics of the source of the input fluid stream, infiltration in soil of the input fluid stream, interception by elements in the input fluid stream and aspect ratio. Characteristic of the source of the input fluid stream generally refers to those characteristics that are developed by humans and tend to inform on such issues as how a certain piece of land, e.g., land present in a catchment, has been developed/used and to what extent the land has been developed/used, or not developed/used at all. As another example, this characteristic of the source may inform an inquiry regarding whether the piece of land at issue is in an urban setting, in a residential area, part of a rural area, included within agricultural land or part of a parkland.

In sharp contrast, geomorphological characteristics of the source of the input fluid stream generally refers to naturally occurring characteristics, and that are generally not developed by humans. These characteristics address such issues as how many sub-catchments have been formed, over a certain period of time, inside a piece of land at issue and how rainfall runoff response works inside a piece of land at issue.

The hydrological parameter or synthetic hydrological parameter of infiltration in soil of the input fluid stream informs on the amount of water absorbed by the soil, as opposed to flows away as runoff. Interception by elements addresses such issues as the amount of water captured on the surface of the catchment, such as on the surfaces of tree leaves and grass because such intercepted water on the catchment surface eventually evaporates, and is not transported through the fluid infrastructure. Slope refers to the slope of the catchment or sub-catchment from where the input fluid stream originates.

In preferred embodiments of step 812, training includes, for each cascade level present in the fluid infrastructure, iterating, using the cascading treatment processor, the summation expression by advancing time dependent values of $Q_{i-1}''(t)$ and $w_k$ until a resulting value of each of the summation expression converges to and/or is approximately equal to the real time flow condition attribute value of the distant fluid treatment facility. Training, in step 812, may include, for the each cascade level in the fluid infrastructure, measuring, using the distant fluid treatment facility sensor, a real time distant flow condition attribute value of the distant fluid treatment facility.

In preferred embodiments of the present teachings, method 800 includes adjusting a fluid flow that is directed through each of the flow-directing devices to minimize, for each cascade level present in the fluid infrastructure, the sum of the predicted modified total load value at the certain instances in time and the real time total load value obtained from operation of the distant fluid treatment facility sensor at the same instances in time. This adjusting step is carried out using a fluid flow controller that is communicatively coupled to multiple flow-directing devices, each operating at a cascade level of the fluid infrastructure. As a result, the above-mentioned sum for each cascade in the fluid infrastructure is, preferably, minimized.

In certain embodiments of the present teachings, method 800 further includes a step of receiving, from a weather forecast information provider, weather forecast information. The weather forecast information is used in predicting, as described in step 808, the predicted modified flow condition attribute value for each of the input fluid streams entering the distant fluid treatment facility. In an exemplar implementation of this embodiment, method 800 may further still include a step of receiving and using at least one of one or more historical modified fluid condition attribute values, one or more historical distant fluid condition attribute values and/or one or more distant pre-processing flow condition attribute values to carry out step 808 and produce a resulting predicted modified flow condition attribute value for each of the input fluid streams entering the distant fluid treatment facility. In this implementation, the historical modified fluid condition attribute values, the historical distant fluid condition attribute values and the historical distant pre-processing flow condition attribute values are also used in training step 812 to determine a converging value for the predicted modified total load value that minimizes the sum described in step 812 for each cascade level.

In another exemplar implementation of this embodiment, method 800 further includes using one or more of the historical modified fluid condition attribute values, one or more historical distant fluid condition attribute values and/or one or more distant pre-processing flow condition attribute values in predicting step 808 to predict, $w_k$, as described above.

Method 800 may also provide information regarding proximate fluid treatment facility after a cascading event. In these embodiments of the present teachings, method 800 may include obtaining a proximate flow condition measurement using a proximate fluid treatment facility sensor disposed inside a proximate fluid treatment facility. Then, method 800 may proceed to calculating, using the neural network and based upon the proximate flow condition measurement, a proximate flow condition attribute value for the proximate fluid treatment facility, which is proximate to a flow-directing device relative to the distant fluid treatment facility. Finally, method 800 may conclude by determining, using the cascading treatment processor and based upon the minimized sum, obtained from the training, a modified total load value for the proximate fluid treatment facility.

Although illustrative embodiments of the present teachings and arrangements are shown and described in terms of controlling fluid within a sewer system, other modifications, changes, and substitutions are intended. By way of example, certain embodiments discuss processing fluid streams found in sewage systems, but the present teachings and arrangements are not so limited, and extend to any water collection and conveyance systems. Accordingly, it is appropriate that the disclosure be construed broadly and in a manner consistent with the scope of the disclosure, as set forth in the following claims.

What is claimed is:

1. A fluid stream management system comprising:
one or more downstream processing sub-systems, each of which is associated with one or more distant fluid treatment facilities and comprises:
one or more fluid treatment facility sensors disposed inside one or more of said distant fluid treatment facilities for providing a flow condition measurement for one or more of said distant fluid treatment facilities, wherein said flow condition measurements provide information regarding at least one of transport, storage and treatment of one or more of input fluid streams inside each of said distant fluid treatment facility; and
one or more pre-processing flow sensors for facilitating determination of one or more of flow condition attribute values of one or more of said input fluid streams prior to entering each of said distant fluid treatment facility;
one or more neural networks, each of which comprises:
an input layer that is communicatively coupled to one or more of said fluid treatment facility sensors and/or one or more of said pre-processing flow sensors and configured to receive said flow condition measurements of one or more of said input fluid streams flowing into each of said distant fluid treatment facility;
one or more intermediate layers, based upon one or more of said flow condition measurements, calculate an initial distant flow condition attribute value; and
an output layer that is capable of outputting said initial distant flow condition attribute value;
a cascading treatment processor communicatively coupled to said output layer and includes or is also communicatively coupled to a hydrological information database that has stored thereon historical hydrological information, wherein, during a processing operation, said cascading treatment processor, based upon said historical hydrological information obtained from said hydrological information database, predicts one or more predicted modified contribution values and one or more predicted modified flow condition attribute values to further predict a predicted modified total load value for each of said distant fluid treatment facility;
multiple fluid flow controllers, each of which is coupled to said cascading treatment processor and is designed to be coupled to at least one or more of flow-directing devices such that at least one of said flow-directing devices is associated with at least one of said fluid flow controllers, wherein during an operative state of one or more of said fluid flow controllers, at least one of said fluid flow controllers adjust fluid flow through at least one of said flow-directing devices towards one or more of said distant fluid treatment facilities such that, for each of said distant fluid treatment facilities, a sum of at least one of a real time total load value and at least one of said predicted modified total load value is minimized, wherein said real time total load value of one or more of said distant fluid treatment facilities is based upon measurements obtained from one or more of said distant fluid treatment facility sensors,
wherein in each of said fluid flow controllers are associated with a particular cascade level in a hierarchical arrangement such that fluid flow beginning from a first cascade level, disposed at an upstream location, cascades down, by operation of said flow-directing device, to one or more subsequent cascade levels that are serially coupled and disposed at downstream locations, and wherein said flow-directing device is associated with said fluid flow controller that is in turn associated with one of said cascade levels; and
a training engine loaded on said cascading treatment processor for iterating, for each of said cascade levels, a summation expression, $\Sigma w_k*(Q_i-Q_{i-1}''(t))$ by advancing time dependent values of $Q_{i-1}''(t)$ and $w_k$ until a resulting value of said summation expression, for each of said cascade level, converges to and/or is approximately equal to said real time flow condition attribute value of said distant fluid treatment facility, and wherein said each summation expression accounts for time dependent volumetric contribution by each of said input fluid streams flowing into said distant fluid treatment facility, wherein in said summation expression, said k is a number that identifies an input fluid stream and ranges from 1 to r, which value represents a total number of input fluid streams flowing into said distant fluid treatment facility, said j identifies a particular cascade level and is a number that ranges from 1 to n, which value represents a total number of said cascade levels present in said fluid infrastructure, said $Q_i$ is obtained from said neural network and represents said initial distant flow condition attribute value for said distant fluid treatment facility, and said $Q_{i-1}''(t)$ represents said pre-processing flow condition attribute value, which is a time dependent variable informing on modifications to said initial distant flow condition attribute value for said distant fluid treatment facility.

2. The fluid stream management system of claim 1, wherein one or more said fluid flow controllers is a proportional-integral-derivative controller that is configured to compute:

$$(K_p\, X\, e) + (K_i\, X\, \text{integral}[0,t](e)) + (K_d\, de/dt),$$

wherein said $K_p$ is a proportional constant, said $K_i$ is an integral constant, said $K_d$ is a derivative constant, and said e equals the difference between said real time total load value of at least one of said distant fluid treatment facility and at least one of said predicted modified total load value of said distant fluid treatment facility.

3. A method for controlling transport of a fluid stream, said method comprising:
   obtaining, using a distant fluid treatment facility sensor for a distant fluid treatment facility, a flow condition measurement;
   arriving at, using one or more pre-processing flow sensors, a distant pre-processing flow condition attribute value for one or more of said input fluid streams entering said distant fluid treatment facility;
   calculating, using a neural network and based upon said flow condition measurement, an initial distant flow condition attribute value;
   predicting, based upon said initial distant flow condition attribute value and said distant pre-processing flow condition attribute value, a predicted modified flow condition attribute value and a predicted modified contribution value for each of said input fluid streams entering said distant fluid treatment facility, wherein said predicted modified flow condition attribute value accounts for changes in said initial distant slow condition attribute value, as a function of time, of said distant fluid treatment facility and/or of one or more of said input fluid streams entering said distant fluid treatment facility, wherein said predicted modified contribution value accounts for flow condition contribution of each of said input fluid streams flowing into said distant fluid treatment facility;
   computing, using a cascading treatment processor, a predicted modified total load value of said distant fluid treatment facility, which is a sum of individual products, obtained for each of said input fluid streams flowing into said distant fluid treatment facility, of said predicted modified contribution value and said predicted modified fluid condition attributes value associated with said input fluid stream;
   training said cascading treatment processor to minimize a sum, computed for said distant fluid treatment facility, of predicted modified total load value at certain instances in time and a real time total load value that is obtained from operation of said distant fluid treatment facility sensor at said certain instances in time; and
   partitioning a fluid infrastructure into a hierarchical arrangement of different cascade levels such that fluid flow beginning from a first cascade level, disposed at an upstream location, cascades down to one or more subsequent cascade levels that are serially coupled and disposed at downstream locations, wherein fluid management at each of said subsequent cascade levels is facilitated by a fluid treatment facility that serves as said distant fluid treatment facility to a previous cascade level, and wherein said previous cascade level immediately precedes said subsequent cascade level,
   wherein said predicting predicts, for each of said cascade levels, a value of an expression, $Q_i$-$Q_{i-1}''(t)$, wherein j identifies a particular cascade level and is a number that ranges from 1 to n, which value represents a total number of said cascade levels present in said fluid infrastructure, wherein said $Q_i$ is obtained from said neural network and represents, for said particular cascade level, said initial distant flow condition attribute value for said distant fluid treatment facility, and wherein said $Q_{i-1}''(t)$ represents, for said particular cascade level, said pre-processing flow condition attribute value, which is a time dependent variable informing on modifications to said initial distant flow condition attribute value for said distant fluid treatment facility.

4. The method for controlling transport of a fluid stream of claim 3, wherein for each of said cascade levels, said arriving step includes using measurement representations, obtained from one or more of said pre-processing flow sensors or obtained from said neural network, as input into said cascading treatment processor to arrive at said pre-processing flow condition attribute value for each of said input fluid stream entering said distant fluid treatment facility.

5. The method for controlling transport of a fluid stream of claim 3, wherein said calculating is carried out by an intermediate layer of said neural network.

6. The method for controlling transport of a fluid stream of claim 3, wherein said predicting includes calculating a time-dependent variable, $w_k$, which represents said predicted modified contribution value of a particular input fluid stream flowing into said distant fluid treatment facility, wherein said k is a number that identifies said particular input fluid stream and ranges from 1 to r, which value represents a total number of input fluid streams flowing into said distant fluid treatment facility.

7. The method for controlling transport of a fluid stream of claim 6, wherein in said computing, said predicted modified total load value, is represented by a summation expression, $\Sigma w_k^*(Q_i\text{-}Q_{i-1}''(t))$, computed for all values of k, ranging from 1 to said r, and accounts for time dependent volumetric contribution by each of said input fluid streams flowing into said distant fluid treatment facility, and wherein said summation expression is computed for each of said cascade levels.

8. The method for controlling transport of a fluid stream of claim 7, wherein said training includes, for each of said cascade levels, iterating, using said cascading treatment processor, said summation expression by advancing time-dependent values of $Q_{i-1}''(t)$ and $w_k$ until a resulting value of each of said summation expression converges to and/or is approximately equal to said real time flow condition attribute value of said distant fluid treatment facility.

9. The method for controlling transport of a fluid stream of claim 8, wherein said training includes, for each of said cascade levels, measuring, using said distant fluid treatment facility sensor, a real time distant flow condition attribute value of said distant fluid treatment facility.

10. The method for controlling transport of a fluid stream of claim 9, wherein said predicting is carried out using one member chosen from a group comprising said cascading treatment processor, said neural network and another neural network.

11. The method for controlling transport of a fluid stream of claim 9, wherein said computing uses at least one hydrologic parameter selected from or at least one synthetic hydrologic parameter related to one member selected from a group comprising area of source of an input fluid stream, characteristic of said source of said input fluid stream, amount of time taken to fully realize a single unit of flow in said input fluid stream, geomorphological characteristics of said source of said input fluid stream, infiltration in soil of said input fluid stream, interception by surface elements in said input fluid stream, slope and aspect ratio.

12. The method for controlling transport of a fluid stream of claim 9, further comprising adjusting, using a fluid flow controller that is communicatively coupled to multiple flow-directing devices, each of which is associated with one of said cascade levels, and fluid flow being directed through each of said flow-directing devices to minimize, for each of said cascade levels, said sum of said predicted modified total load value at said certain instances in time and said real time total load value obtained from operation of said distant fluid treatment facility sensor at said certain instances in time.

13. The method for controlling transport of a fluid stream of claim 3, further comprising receiving, from a weather forecast information provider, weather forecast information, wherein said weather forecast information is used in said predicting to predict said predicted modified flow condition attribute value for each of said input fluid streams entering said distant fluid treatment facility.

14. The method for controlling transport of a fluid stream of claim 3, further comprising receiving and using at least one of one or more historical modified fluid condition attribute values, one or more historical distant fluid condition attribute values and/or one or more historical distant pre-processing flow condition attribute values to compute said predicted modified fluid condition attribute values, said distant fluid condition attribute values and said distant pre-processing flow condition attribute values, respectively, and wherein said training includes using one or more of said historical modified fluid condition attribute values, one or more of said historical distant fluid condition attribute values and/or one or more of said historical distant pre-processing flow condition attribute values for arriving, in an iteration scheme, at a converging predicted modified total load value that minimizes said sum.

15. The method for controlling transport of a fluid stream of claim 3, further comprising using one or more of said historical modified fluid condition attribute values, one or more distant fluid condition attribute values and/or one or more distant pre-processing flow condition attribute values in said predicting to predict said predicted modified contribution value and said predicted modified contribution value of a particular input fluid stream flowing into said distant fluid treatment facility, for each of said cascade level.

16. The method for controlling transport of a fluid stream of claim 3, further comprising:
   obtaining a proximate flow condition measurement using a proximate fluid treatment facility sensor disposed inside a proximate fluid treatment facility;
   calculating, using said neural network and based upon said proximate flow condition measurement, a proximate flow condition attribute value for said proximate fluid treatment facility, which is proximate to a flow-directing device relative to said distant fluid treatment facility; and
   determining, using said cascading treatment processor and based upon said minimized sum, obtained from said training, a modified total load value for said proximate fluid treatment facility.

* * * * *

UNITED STATES PATENT AND TRADEMARK OFFICE
CERTIFICATE OF CORRECTION

PATENT NO. : 12,037,262 B2  
APPLICATION NO. : 17/161674  
DATED : July 16, 2024  
INVENTOR(S) : Buahin et al.

Page 1 of 1

It is certified that error appears in the above-identified patent and that said Letters Patent is hereby corrected as shown below:

In the Claims

Column 16, Claim 1, Line 54:  
Please correct "$\sum w_k*(Q_i - Q_{i-1})''(t))$" to read -- $\sum w_k*(Q_j - Q_{j-1})''(t))$ --

Column 16, Claim 1, Line 55:  
Please correct "$Q_{i-1}''(t)$" to read -- $Q_{j-1}''(t)$ --

Column 17, Claim 1, Line 5:  
Please correct "$Q_i$" to read -- $Q_j$ --

Column 17, Claim 1, Line 8:  
Please correct "$Q_{i-1}''(t)$" to read -- $Q_{j-1}''(t)$ --

Column 18, Claim 3, Line 11:  
Please correct "$Q_i - Q_{i-1}''(t)$" to read -- $Q_j - Q_{j-1}''(t)$ --

Column 18, Claim 3, Line 15:  
Please correct "$Q_i$" to read -- $Q_j$ --

Column 18, Claim 3, Line 19:  
Please correct "$Q_{i-1}''(t)$" to read -- $Q_{j-1}''(t)$ --

Column 18, Claim 7, Line 49:  
Please correct "$\sum w_k*(Q_i - Q_{i-1})''(t))$" to read -- $\sum w_k*(Q_j - Q_{j-1})''(t))$ --

Column 18, Claim 8, Line 59:  
Please correct "$Q_{i-1}''(t)$" to read -- $Q_{j-1}''(t)$ --

Signed and Sealed this  
Twenty-seventh Day of August, 2024

Katherine Kelly Vidal  
*Director of the United States Patent and Trademark Office*